United States Patent Office 3,157,667
Patented Nov. 17, 1964

3,157,667
ORGANIC DYESTUFFS
Walter Kern, Sissach, Willy Mueller, Riehen, and Adolf Emil Siegrist, Basel, Switzerland, assignors to Ciba Limited, Basel, Switzerland, a company of Switzerland
No Drawing. Filed June 19, 1962, Ser. No. 203,435
Claims priority, application Switzerland, June 21, 1961, 7,270/61; May 9, 1962, 5,555/62
8 Claims. (Cl. 260—303)

The present invention provides new valuable organic dyestuffs in which both carbonyl groups of a thiophene dicarboxylic acid radical are joined amide-like to the amino group of an acylatable aromatic amine, the said amino group being attached directly to the aromatic radical, and the radical of at least one amine containing a chromophore.

The dyestuffs of the invention correspond to the general formula (1) 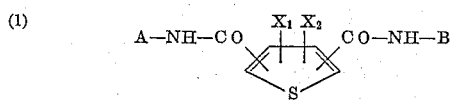

in which A and B represent the radicals of an aromatic amine and of which at least one contains a chromophore, and $X_1$ and $X_2$ represent, for example, hydrogen atoms, lower alkyl, aryl, hydroxyl or alkoxy groups or halogen atoms.

In the dyestuffs of the invention one or both of the radicals A and B in the general Formula 1 which may also be identical, represents a radical that contains a chromophore, for example, a vattable radical, especially an unsubstituted or a substituted anthraquinone radical or a radical with more than 3 fused rings.

In accordance with the invention the new dyestuffs are prepared by heating a reactive derivative of a thiophene dicarboxylic acid or tetrahydrodichlorothiophene dicarboxylic acid in a molar ratio of about 1:2 with a primary or secondary aromatic amine in which the nitrogen atom of the amino group is directly attached to an aromatically bound carbon atom, and of which at least 1 mol contains a colored radical, preferably a vattable radical, in which process the condensation is performed in such a manner that at least one amine radical that contains a chromophore is present in the molecule of the condensation product.

The condensation process of the invention is advantageously carried out in an anhydrous medium. Under such conditions it takes place at temperatures within the boiling range of normal organic solvents such, for example, as toluene, monochlorobenzene, dichlorobenzene, trichlorobenzene and nitrobenzene.

If desired, an agent capable of binding acid as, for example, anhydrous sodium acetate or pyridine can be used in order to accelerate the reaction.

As reactive derivatives of thiophenedicarboxylic acids, as used in the manufacture of the dyestuffs of the invention, there may be mentioned, for example, the anhydrides thereof, particularly the halides, and more especially the chlorides. The chlorides can be prepared in a simple manner by reacting the dicarboxylic acid with an acid halogenating agent, advantageously thionyl chloride, at a raised temperature in an inert organic solvent, preferably in the presence of a catalyst as, for example, pyridine or dimethylformamide.

The halides obtained from the thiophenedicarboxylic acids generally do not have to be isolated, but can be reacted directly with the amines of the kind defined below, if desired, after removal of the excess acid halogenating agent, an operation that is easy to carry out. However, in the manufacture of the dyestuffs of the invention it is also possible to start from the acid chloride of a preliminary stage of the thiophenedicarboxylic acids, namely the tetrahydro-dichlorothiophenedicarboxylic acids. Under the conditions of the reaction 4 mols of hydrogen chloride per mol of acid chloride are split off, and the products obtained are identical with those obtained when starting from thiophenedicarboxylic acid chlorides.

As starting materials for the manufacture of the dyestuffs of the invention there are used thiophenedicarboxylic acids, for example, substituted thiophenedicarboxylic acids, such, for example, as:

3:4-dichlorothiophene-2:5-dicarboxylic acid,
3-phenylthiophene-2:5-dicarboxylic acid,
3-para-tolylthiophene-2:5-dicarboxylic acid,
3-α-naphthylthiophene-2:5-dicarboxylic acid,
3-methylthiophene-2:5-dicarboxylic acid,
5-methylthiophene-2:3-dicarboxylic acid,
3:4-dihydroxythiophene-2:5-dicarboxylic acid,
3:4-dimethoxythiophene-2:5-dicarboxylic acid and
3:4-diphenylthiophene-2:5-dicarboxylic acid, or unsubstituted thiophenedicarboxylic acids such, for example, as:

Thiophene-2:3-dicarboxylic acid,
Thiophene-2:4-dicarboxylic acid,
Thiophene-3:4-dicarboxylic acid, and especially
Thiophene-2:5-dicarboxylic acid.

Thiophenedicarboxylic acids can be manufactured by known processes that have been published, for example, by the process described by Griffing and Salisbury (Journal of the American Chemical Society, 70, 3416 (1948)).

As starting substances for the manufacture of the dyestuffs of the invention by reaction with a reactive derivative of a thiophenedicarboxylic acid there are used aromatic amines, as, for example, aniline, 3-aminopyrene or diamines which, after condensation with the reactive thiophenedicarboxylic acid derivative, can be converted by diazotization and coupling into colored amine derivatives, for example, para-phenylenediamine, 2:5-dichloro-para-phenylenediamine, or colored amines such, for example, as amino-azo dyestuffs of the formula

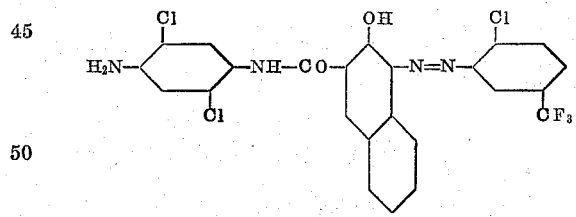

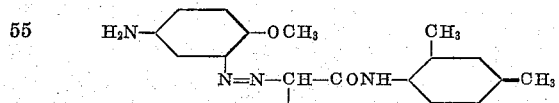

or

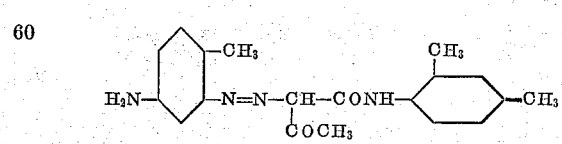

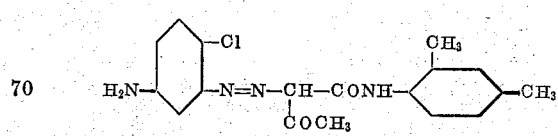

but especially vattable amines, for example, aminoanthraquinones, such, for example, as:

1-amino-anthraquinone and substituted amino-anthraquinones, especially
1-amino-5-benzoylamino-anthraquinone,
1-amino-4-benzoylamino-anthraquinone,
1-amino-4-methoxyanthraquinone,
1-amino-8-chloro-anthraquinone,
1-amino-6(7)-chloro-anthraquinone,
1-amino-7-methylmercapto-anthraquinone,
1-amino-5-chloro-anthraquinone,
1-amino-6:7-dichloro-anthraquinone,
1-amino-2-chloro-anthraquinone,
1-amino-6-methylsulfonyl-anthraquinone,
1-choloro-2-amino-anthraquinone,
2-amino-3-chloro-anthraquinone,
2-amino-3-bromo-anthraquinone,
1-amino-6:7-dichloro-anthraquinone,
1:4-diamino-anthraquinone - 2 - carboxylic acid - isobutyl ester, and amino-anthraquinones witht heterocyclic 1:9 rings, such as
4-amino-anthrapyrimidine,
5-amino-anthrapyrimidine,
5-amino-isothiazole-anthrone, or those with more than 3 fused isocyclic rings, such as amino-dianthrimide-carbazole, amino-dibenzanthrone,
amino-acedianthrone,
amino-isodibenzanthrone,
amino-benzanthrone,
4-amino-anthraquinone-1:2:2':1'-benzacridone,
4-amino-anthraquinone-1:2:2':1'-chloro-benzacridone,
amino-dibenzypyrenequinone,
amino-pyranthrone,
amino-anthanthrone, and compounds of the formula

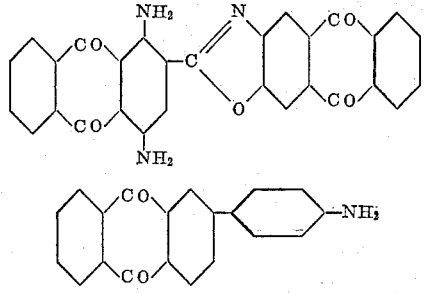

The dyestuffs are generally obtained in a very good yield and in a pure state.

If, in the manufacture of the new dyestuffs of the invention, an asymmetrical condensation is required, the operation can be performed in two steps, for example, as follows:

One mol of an amine is added to a solution of one mol of the thiophenedicarboxylic acid derivative in an inert organic solvent and condensed at 80 to 100° C, after which one mol of the second amine is added and condensation is carried out at a higher temperature, for example, at the boiling temperature of the solvent used.

However, it is also possible to start from the free thiophene-2:5-dicarboxylic acid and to react it directly with the appropriate aromatic amine with the assistance of phosporous pentoxide using trichlorobenzene as a solvent, in which process it is assumed that an anhydride is intermediately formed as the reactive derivative of the thiophenedicarboxylic acid.

If at least one mol of a vattable amine is used for each mol of thiophenedicarboxylic acid derivative, the dyestuffs of the invention can be vat dyestuffs. Such vat dyestuffs can be used in the usual manner for dyeing or printing a very wide variety of fibers, especially fibers based on cellulose, for example, cotton, jute, ramine, flax and filaments and staple fibers made of regenerated cellulose. If desired, they can also be applied to other fibers, such as silk, wool, polyamides and acetate rayon. They can also be converted by known method into the corresponding leuco esters, especially sulfato esters and applied according to the methods usually adopted for this class of dyestuff.

Those dyestuffs of the invention which are vat dyestuffs yield bright and very fast dyeings on cotton and, together with the non-vattable dyestuffs, are also valuable pigments that are distinguished by very good fastness to light and very good fastness to migration.

Apart from using them for coloring plastics, the dyestuffs of the invention can also be used for pigment printing that is to say, for printing processes in which pigments are fixed on a substratum, particularly a textile fiber or another sheet-like substratum, such as paper (e.g. wallpaper) or fabrics of glass fibers, with a suitable adhesive such, for example, as casein, a thermosetting resin, particularly a urea- or melamine-formaldehyde condensation product, or solutions or emulsions of polyvinyl chloride or polyvinyl acetate, or other emulsions (e.g. oil-in-water or water-in-oil emulsions). The pigments of the invention can also be used in a finely divided form for the spin-dyeing of rayon or viscose or cellulose ethers or esters or polyamides or polyurethanes, and also for the manufacture of colored lacquers or lacquers-formers, solutions or products of acetyl-cellulose, nitrocellulose, natural or synthetic resins, such as polymerisation or condensation resins, for example, aminoplasts, phenoplasts, polystyrene, polyethylene, polypropylene, polyacrylates, rubber, casein, silicone or silicone resins. They can also be used in the manufacture of colored pencils, cosmetic preparations or laminated sheet material.

The dyestuffs of the invention are also suitable for working up into pigment preparations, in which process they are subjected to a mechanical grinding and dispersing treatment in an organic medium that is solid at 20° C. or in a liquid with a viscosity of at least 10 centipoises in the presence of grinding elements, the grinding elements subsequently being washed out of the dispersions so obtained. Depending on the organic medium used in the pigment preparations so obtained can be used for the spin-coloration of a very wide variety of synthetic fibers, for example, for the spin-coloration of cellulose acetate rayon, fibers made of polyamides and polyurethanes, and fibers made of polyacrylic derivatives, especially polyacrylonitrile, polyesters of the terephthalic acid glycollic ester type, and synthetic fibers made of polyvinyl compounds, and also for the coloration of lacquers and paints.

The following examples illustrate the invention. Unless otherwise stated, the parts and percentages are by weight.

*Example 1*

17.2 parts of thiophene-2:5-dicarboxylic acid together with 438 parts of trichlorobenzene and 38.1 parts of thionylchloride are heated to 115° C. in the course of 1 hour while stirring. Approximately 0.1 part of pyridine is then added and stirring is continued at that temperature for 1 hour, in which process complete dissolution takes place accompanied by the formation of thiophene-2:5-dicarboxylic acid chloride. After the excess thionylchloride has been removed by passing through dry air, the trichlorobenzene-thiophene-2:5-dicarboxylic acid chloride solution is introduced at 50° C. into 730 parts of trichlorobenzene that contains 46.8 parts of 1-amino-anthraquinone. The reaction mixture is then brought to the boil within 1½ hours while stirring and maintained at the boil for ¼ hour. After cooling the reaction mixture, it is suction-filtered and the residue is washed with trichlorobenzene and alcohol and then dried. Yellow crystals are obtained in a very good yield. They dissolve in concentrated sulfuric acid to give a reddish orange solution, and dye cotton very fast greenish yellow tints from a blackish violet vat.

The dyestuff shows the following analysis values:

N calculated 4.81%    N found 4.79%
S calculated 5.5%     S found 5.83% and also gives fast yellow tints in PVC and stoving enamel.

*Example 2*

17.2 parts of thiophene-2:5-dicarboxylic acid together with 438 parts of trichlorobenzene and 38.1 parts of thionyl-chloride are heated to 115° C. in the course of 1 hour while stirring. Approximately 0.1 part of pyridine is then added and stirring is continued at that temperature for 1 hour, in which process complete dissolution takes place accompanied with the formation of thiophene-2:5-dicarboxylic acid chloride. After the excess thionyl-chloride has been removed by passing through dry air, the trichlorobenzene-thiophene-2:5-dicarboxylic acid chloride solution is introduced at 50° C. into 880 parts of trichlorobenzene to which have been added 71.8 parts of 1-amino-5-benzoylamino-anthraquinone. The reaction mixture is then brought to the boil within 1½ hours while stirring well, and maintained at the boil for ¼ hour, the dyestuff partially precipitating at this stage. After cooling the reaction mixture, it is suction-filtered and the residue is washed with trichlorobenzene and alcohol and then dried. Yellow crystals are obtained in a very good yield. They dissolve in concentrated sulfuric acid to give a reddish brown solution, and dye cotton very pure and fast golden yellow tints from a blackish olive vat. The same dyestuff produces fast yellow tints in PVC and stoving enamels.

As the following table shows, other dyestuffs can be prepared by the methods described in Examples 1 and 2 by varying the amino component. The left-hand column indicates the amine used and the other columns show the tints obtained.

When the amino component employed is 1:4-diaminoanthraquinone-2-carboxylic acid isobutyl ester, the resulting product has the formula:

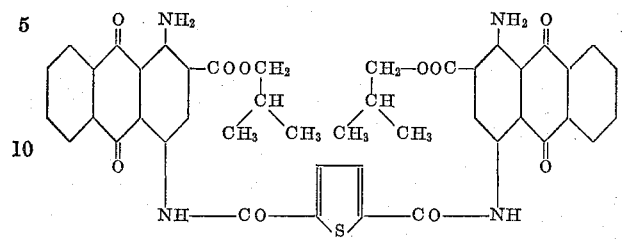

*Example 3*

2.41 parts of 3:4-dichlorothiophene-2:5-dicarboxylic acid together with 44 parts of trichlorobenzene and 3.8 parts of thionyl chloride are heated to 115° C. in the course of 1 hour while stirring. Approximately 0.05 part of pyridine is then added and stirring is continued at 115° C. for 1 hour, in which process complete dissolution takes place accompanied with the formation of 3:4-dichlorothiophene-2:5-dicarboxylic acid chloride. After the excess of thionyl-chloride has been removed, the solution of 3:4-dichlorothiophene-2:5-dicarboxylic acid chloride in trichlorobenzene is run into 73 parts of trichlorobenzene at 50° C. to which 4.68 parts of 1-amino-anthraquinone have been added. The reaction mixture is then brought to the boil within 1½ hours while stirring well and maintained at the boil for a further ¼ hour. After cooling the reaction mixture, the dyestuff is isolated by suction-filtration, washed with trichlorobenzene and alcohol and then dried. Yellow crystals are obtained that dissolve in concentrated sulfuric acid to give a reddish orange solution. They dye cotton greenish yellow tints from a bordeaux vat.

If 1-amino-anthraquinone is replaced by 1-amino-5-benzoylamino-anthraquinone, there is obtained a dyestuff that dyes cotton fast yellow tints from a violet vat.

|    | Amino component | Tint on cotton | Tint in PVC | Tint in stoving enamel |
|----|-----------------|----------------|-------------|------------------------|
| 1  | 4-amino-anthraquinone-1:2:2′:1′-benzacridone | Blue-green | Blue-grey | Blue-grey. |
| 2  | 1-amino-4-benzoylamino-anthraquinone | Red-brown | Reddish violet | Reddish violet. |
| 3  | 1-amino-4-methoxy-anthraquinone | Orange | Orange | Orange. |
| 4  | 1-amino-6(7)-chloro-anthraquinone | Greenish yellow | Greenish yellow | Greenish yellow. |
| 5  | 1-amino-4-phenyl-amino-anthraquinone |  | Grey-green | Grey-green. |
| 6  | 1-amino-5-chloro-anthraquinone | Greenish yellow | Yellow | Yellow. |
| 7  | Amino-dibenzanthrone | Green-grey | Grey | Blue-grey. |
| 8  | 1:4-diamino-anthraquinone-2-carboxylic acid isobutyl ester | Navy blue |  |  |
| 9  | 5-amino-isothiazole-anthrone |  | Yellow | Yellow-brown. |
| 10 | 1-amino-6-methyl-sulfone-anthraquinone | Pure yellow |  |  |
| 11 | 1-amino-7-methylmercapto-anthraquinone | Yellow |  |  |
| 12 | 1-amino-6:7-dichloro-anthraquinone | ....do.... |  |  |
| 13 | 4-amino-1:9-anthra-pyrimidine | Greenish yellow |  |  |
| 14 | 5-amino-1:9-anthra-pyrimidine | Yellow-brown |  |  |
| 15 | 1-amino-8-chloro-anthraquinone | Greenish yellow |  |  |

When the amino component employed is 1-amino-5-benzoylamino-anthraquinone as in the first paragraph of this example, the resulting product has the formula:

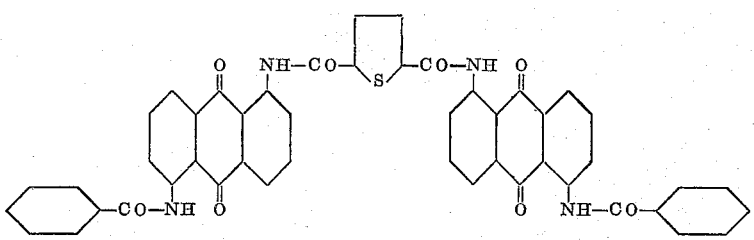

If 3:4-dichlorothiophene-2:5-dicarboxylic acid is replaced by 3:4-diphenylthiophene-2:5-dicarboxylic acid and condensation is carried out with 1-amino-anthraquinone or 1-amino-5-benzoylamino-anthraquinone according to the process described in the first paragraph, there are obtained dyestuffs that dye cotton greenish yellow tints.

*Example 4*

4.3 parts of thiophene-2:5-dicarboxylic acid together with 90 parts of nitrobenzene and 9.6 parts of thionyl-chloride are heated to 115° C. in the course of 1 hour while stirring. Approximately 0.1 part of pyridine is then added and stirring is continued at that temperature for 1 hour, in which process complete dissolution takes place accompanied with the formation of thiophene-2:5-dicarboxylic acid chloride. After the excess thionyl-chloride has been removed, the solution of thiophene-2:5-dicarboxylic acid chloride in nitrobenzene is introduced into 456 parts of nitrobenzene at 50° C. to which have been added 24.7 parts of finely powdered aminodibenzanthrone. The reaction mixture is then brought to the boil within 1½ hours while stirring well and maintained at the boil for ¼ hour. A large proportion of the dyestuff precipitates while the reaction mixture is still hot, and is isolated by suction-filtration after the mixture has cooled. It is then washed with nitrobenzene and alcohol and dried. The dyestuff so obtained is a dark powder that dissolves in concentrated sulfuric acid to give a violet solution and dyes cotton greenish grey tints from a blue vat.

If amino-isodibenzanthrone is used instead of aminodibenzanthrone there is obtained a dyestuff that dissolves in concentrated sulfuric acid to give a green solution and that dyes cotton navy-blue tints from a reddish brown vat.

*Example 5*

65 parts of stabilized polyvinyl chloride, 35 parts of dioctyl phthalate and 0.2 part of the dyestuff obtained as described in Example 1 are mixed together, and then worked to and fro on a roller mill for 7 minutes at 140° C. A yellow foil is obtained which is fast to light and migration.

*Example 6*

1 part of the dyestuff obtained as described in Example 1 is vatted at 45° C. in 100 parts of water with 2 parts of sodium hydrosulfite in the presence of 4 parts by volume of a sodium hydroxide solution of 30% strength. The stock vat so obtained is introduced into a solution of 4 parts by volume of sodium hydroxide solution of 30% strength and 2 parts of sodium hydrosulfite in 2000 parts of water. 100 parts of cotton are dyed for 1 hour at 40 to 50° C. in the dyebath so obtained in the presence of 10 parts of sodium chloride. The cotton is then squeezed, oxidised in the air, rinsed, acidified, rinsed again and then soaped at the boil. It is dyed a fast and very pure greenish yellow tint.

*Example 7*

9.36 parts of 1-amino-anthraquinone and 5.64 parts of cis-tetrahydrodichlorothiophene-dicarboxylic acid chloride are stirred together with 160 parts of trichlorobenzene. The temperature is raised to 180° C. in the course of ½ hour. Stirring is then continued for a further 2 hours at 180 to 190° C. After cooling the reaction mixture, it is suction-filtered and the residue is washed with trichlorobenzene and alcohol and then dried. Yellow to yellowish brown crystals are obtained in good yield. They dissolve in concentrated sulfuric acid to give a reddish orange solution, and dye cotton very fast greenish yellow tints from a blackish violet vat. The dyestuff is free from chlorine and virtually identical with the dyestuff described in Example 1.

Stirring can also be carried out for 4 hours at 120° C. instead of 2 hours at 180 to 190° C.

The same dyestuff is obtained when trans-tetra-hydrodichlorothiophene-dicarboxylic acid chloride or a mixture of the cis- and trans-compound are used instead of the cis-compound.

*Example 8*

4.3 parts of thiophene-3:4-dicarboxylic acid together with 112 parts of trichlorobenzene and 9.6 parts of thionylchloride are heated to 115° C. in the course of 1 hour while stirring. Approximately 0.1 part of pyridine is then added and stirring is continued at that temperature for 1 hour, in which process complete dissolution takes place accompanied with the formation of thiophene-3:4-dicarboxylic acid chloride. After the excess thionyl chloride has been removed by passing through dry air, the trichlorobenzene-thiophene-3:4-dicarboxylic acid chloride solution is introduced at 50° C. into 450 parts of trichlorobenzene to which have been added 11.7 parts of 1-aminoanthraquinone. The reaction mixture is then brought to the boil within 1½ hours while stirring and is maintained at the boil for 1½ hours. After cooling the reaction mixture, it is suction-filtered and the residue is washed with trichlorobenzene, alcohol, and hot water and then dried. Yellow crystals are obtained in a very good yield. They dissolve in concentrated sulfuric acid to give an orange solution, and dye cotton very fast greenish yellow tints from a red vat. The dyestuff, which has a nitrogen content of 4.87% (theoretical nitrogen content=4.81%) also yields fast yellow tints in polyvinylchloride and stoving enamels.

*Example 9*

(*a*) 18 parts of finely powdered 1-amino-anthraquinone are thoroughly stirred, in small portions, into a mixture of 33 parts of thiophene-2:5-dicarboxylic acid chloride, prepared from thiophene-2:5-dicarboxylic acid and thionyl chloride, purified by vacuum distillation, and 240 parts of dry nitrobenzene at 30° C. The mixture is then kept at 50 to 55° C. until the amino compound is no longer detectable (approximately 2 hours).

After cooling the reaction mixture, the yellow crystals are filtered off, freed from adherent acid chloride by washing with dry nitrobenzene and benzene and then dried over sulfuric acid in a desiccator. There is obtained in good yield the condensation product of 1 mol of thiophene-2:5-dicarboxylic acid chloride and 1 mol of 1-amino-anthraquinone which corresponds to the formula

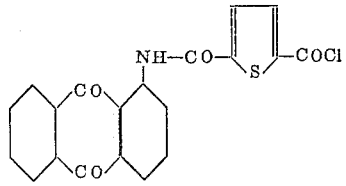

(*b*) To 2.55 parts of 1-amino-4-methoxy-anthraquinone and 144 parts of trichlorobenzene are added 3.95 parts of the product described in paragraph 1, and the whole is heated to the boil in the course of 1½ hours while stirring. After stirring for ¼ hour at the boil, the reaction mixture is allowed to cool, whereupon it is suction-filtered, and the residue is washed with trichlorobenzene, alcohol and hot water, and then dried. There are obtained reddish orange crystals which dissolve in concentrated sulfuric acid to give reddish orange solution and which dye cotton strong yellowish orange tints from a reddish violet vat. The dyestuff is also suitable for coloring polyvinylchloride and stoving enamels orange tints.

If the 1-amino-4-methoxy-anthraquinone used in the second paragraph is replaced by the same amount of 3-aminopyrene, there is obtained a dyestuff that can be used for coloring cotton, polyvinylchloride and stoving enamels.

If the product described in the first paragraph is condensed with aniline in trichlorobenzene, there is obtained a lemon-yellow crystalline powder that colors polyvinylchloride and stoving enamels greenish yellow tints.

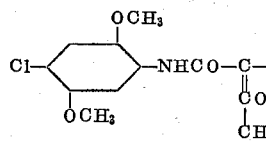 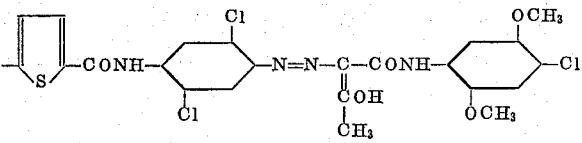

Example 10

8.6 parts of thiophene-2:5-dicarboxylic acid and 23 parts of 1-amino-anthraquinone are stirred together with 420 parts of trichlorobenzene. To this mixture are added 28.4 parts of finely divided phosphorus pentoxide in the course of ½ hour. The reaction mixture is then brought to the boil in the course of 1 hour while stirring vigorously and maintained at the boil for ¼ hour. After cooling the reaction mixture to 25° C., it is suction-filtered and the residue is washed with trichlorobenzene, alcohol and hot water, and then dried. The dyestuff so obtained can be purified by recrystallization from nitrobenzene. Yellow crystals are obtained that dissolve in concentrated sulfuric acid to give a reddish orange solution. They dye cotton fast greenish yellow tints from a blackish violet vat. The dyestuff is virtually identical with the dyestuff described in Example 1, which is evident from the nitrogen content, which is 4.55% (theoretical nitrogen content=4.81%).

Example 11

49.0 parts of the compound of the formula

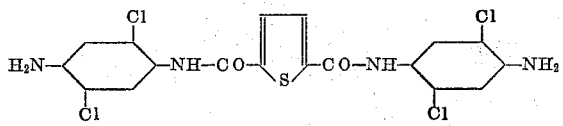

are stirred together with 150 parts of acetic acid and 50 parts of concentrated hydrochloric acid. The thick paste of the dichlorohydrate so obtained is cooled to 0 to 2° C. and 100 parts of ice are added. A solution of 13.8 parts of sodium nitrite in 50 parts of water is then run in at 0 to 5° C. while stirring, in which process a clear yellow diazo solution is formed.

54.5 parts of 4-chloro-2:5-dimethoxy-1-acetoacetyl-aminobenzene are dissolved in 800 parts of water at 40° C. with 25 parts of sodium hydroxide solution of 30% strength. The solution so obtained is, if necessary, filtered until clear and then made up to a volume of 1200 parts. The acetoacetic arylide is precipitated in a fine suspension by the dropwise addition of acetic acid of 40% strength to give a pH value of 6.

The diazo solution is then run in at 30 to 35° C. while stirring well. Coupling takes place very quickly. When the diazo solution has been added, the whole is stirred for 2 hours at 30 to 35° C., heated to 65 to 70° C., and then filtered. The dyestuff so formed is washed with hot water until free from salt and then dried. There are so obtained about 70 parts of the dyestuff of the formula in the form of a loose yellow powder that gives pure yellow tints of excellent fastness to migration in plastic materials, such as polyvinylchloride.

Example 12

5.54 parts of the amino-azo dyestuff of the formula

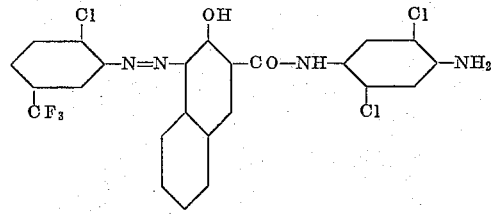

are dissolved in 200 parts of ortho-dichlorobenzene, and 1.02 parts of thiophenedicarboxylic acid chloride are then added while stirring. In this process the insoluble condensation product is formed and a large amount of hydrochloric acid is split off. The reaction mixture is stirred for 6 hours at 140 to 145° C., is allowed to cool to 100° C., and the excess hydrochloric acid is then neutralized by the addition of 2 parts of concentrated ammonia. The whole is then filtered, the residue is washed with hot dichlorobenzene until the filtrate runs colorless and then with cold methanol and, finally, with water. After drying, there are obtained approximately 6 parts of an orange-brown powder that gives strong brownish orange tints of very good fastness to migration in plastic materials, such as polyvinyl chloride.

Example 13

5.66 parts of an azo compound of the formula

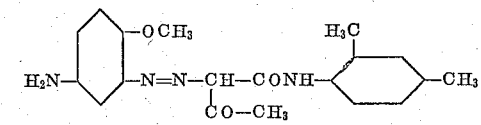

are dissolved in 104 parts of ortho-dichlorobenzene and 1.6 parts of pyridine while heating. The solution so obtained is slowly added, dropwise, while stirring, to a solution of 1.67 parts of thiophene-2:5-dicarboxylic acid chloride in 156 parts of ortho-dichlorobenzene which has been heated to 110° C. A yellow pigment is immediately precipitated. The reaction solution is heated to 145° C. and maintained at this temperature overnight. It is then allowed to cool to 90° C., filtered, and the filter residue is then washed successively with 520 parts of ortho-dichlorobenzene at 100° C., 160 parts of methanol and 200 parts of hot water.

After drying in vacuo there are obtained 5.8 parts (86.5% of the theoretical yield) of a yellow pigment that corresponds to the formula

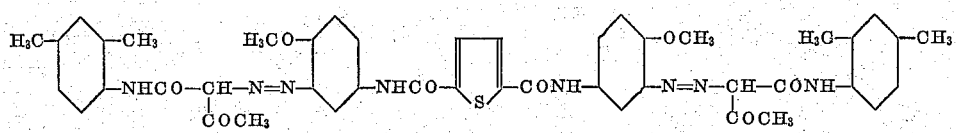

and that gives tints in polyvinyl chloride that are fast to migration.

The aminoazo compound used as starting material is obtained by reduction of the appropriate nitro-azo compound with sodium hydrogen sulfide in dimethyl formamide.

The compounds of the formulae

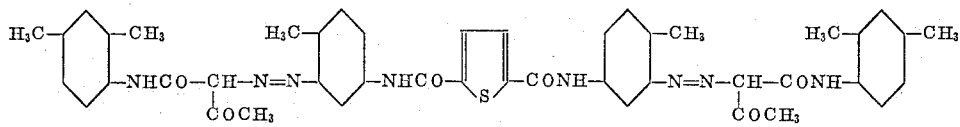

and

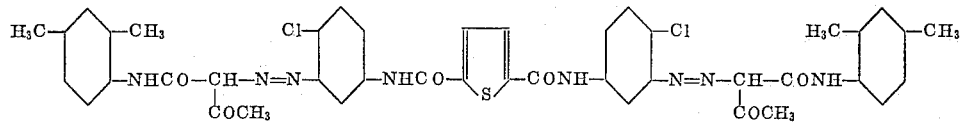

are prepared in an analogous manner. They give yellow tints that are fast to migration when worked into polyvinyl chloride.

What is claimed is:
1. A compound of the formula

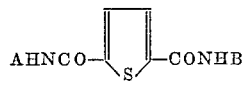

wherein A and B each represents a radical selected from the group consisting of anthraquinonyl-1, 5-benzoylamino-anthraquinonyl-1, 4-methoxy-anthraquinonyl-1, isothiazole-anthronyl-1 and 1-amino - 2 - carbo-isobutoxy-anthraquinonyl-4.

2. The compound of the formula

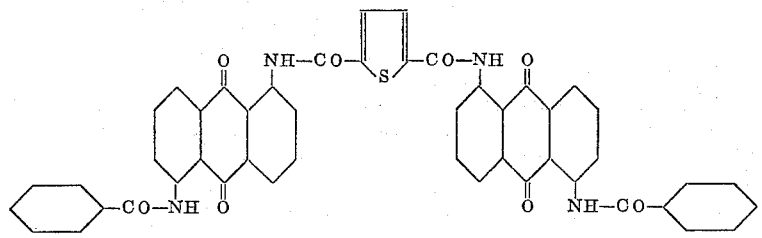

3. The compound of the formula

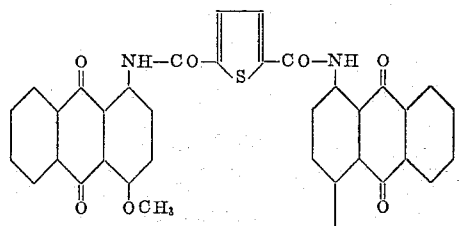

4. The compound of the formula

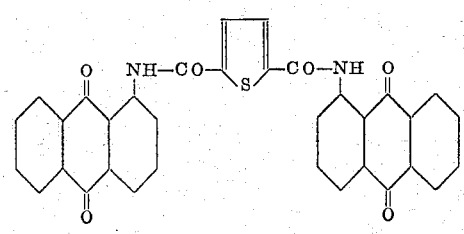

5. The compound of the formula

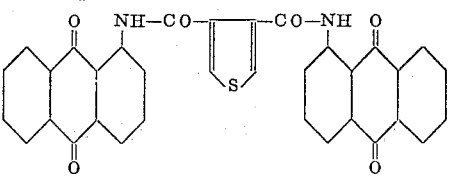

6. The compound of the formula

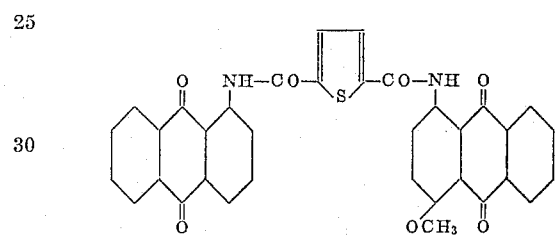

7. The compound of the formula

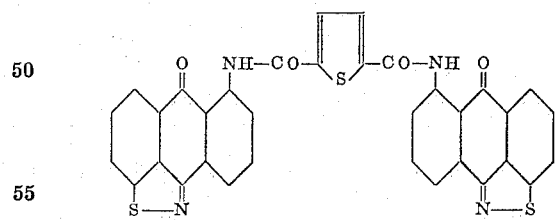

8. The compound of the formula

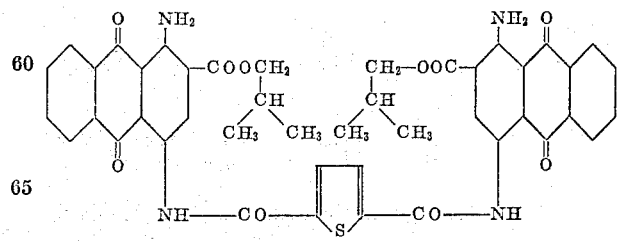

References Cited in the file of this patent
UNITED STATES PATENTS 2,870,168    Randall et al. _____ Jan. 20, 1959
2,985,656    Weber _____ May 23, 1961

FOREIGN PATENTS 661,907    Great Britain _____ Nov. 28, 1951